United States Patent Office 2,809,177
Patented Oct. 8, 1957

2,809,177

POLYHYDROXY-SUBSTITUTED POLYETHERS, THEIR PREPARATION AND RESINOUS PRODUCTS PREPARED THEREFROM

Edward C. Shokal, Walnut Creek, Calif., assignor to Shell Development Company, New York, N. Y., a corporation of Delaware No Drawing. Application February 27, 1956,
Serial No. 567,719

17 Claims. (Cl. 260—18)

This invention relates to a new class of resinous polyols. More particularly, the invention relates to new resinous polyhydroxy-substituted polyethers prepared from epoxy ethers of polyhydric phenols, and to the utilization of the new polyhydroxy-substituted polyethers in the preparation of improved coating compositions.

Specifically, the invention provides new and particularly useful resinous polyols comprising polyhydroxy-substituted polyethers obtained by hydrogenating polyepoxy ethers of polyhydric phenols, and preferably glycidyl polyethers of dihydric phenols. As a special embodiment, the invention provides new resinous polyols of the formula

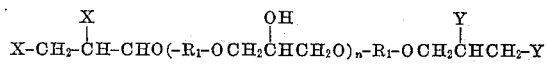

wherein one X and one Y are OH groups and the other X and Y are hydrogen, at least one $R_1$ is a cycloaliphatic radical and the others may be cycloaliphatic or aromatic radicals and $n$ is an integer of at least 1 and preferably 1 to 50.

The invention further provides new derivatives of the above-described resinous polyols, such as, for example, their ether, ester and urethane derivatives, and new coating compositions prepared from the new resinous polyols and their derivatives.

Hydroxy-containing polyethers of polyhydric phenols (e. g., solid grade Epon resins) can be cured to form hard chemical resistant products and should be of considerable use in the preparation of coating compositions. The use of these materials in the preparation of coatings, however, is rather limited because they are insoluble in inexpensive solvents, such as ethanol, and require the use of the more expensive ketone and ester type solvents. In addition, their limited solubility in solvents, such as ethanol, prevents their use in preparing certain types of coating compositions, such as shellacs. Furthermore, these phenolic materials are not particularly suited for use in coatings which are exposed to outdoor conditions as the coatings containing them tend to yellow and lose gloss.

It is an object of the invention to provide a new class of resinous polyols. It is a further object to provide new resinous polyols from polyepoxy polyethers of polyhydric phenols. It is a further object to provide new polyols which possess many of the valuable properties of the polyols derived from polyethers of polyhydric phenols and in addition possess improved solubility in solvents. It is a further object to provide new polyols which may be used to prepare shellacs and related coatings. It is a further object to provide new polyols from polyether polyhydric phenols which may be cured to form coating compositions having improved resistance to yellowing and loss of gloss on outdoor exposure. It is a further object to provide new resinous polyols which may be cured with acidic materials and various methylol-containing materials, to form hard chemical and water resistant films. It is a further object to provide derivatives of the new resinous polyols which may be used to prepare improved coating compositions. These and other objects of the invention will be apparent from the following detailed description thereof.

It has now been discovered that these and other objects may be accomplished in part by the novel resinous polyols of the invention comprising polyhydroxy-substituted polyethers obtained by hydrogenating polyepoxy ethers of polyhydric phenols, and preferably glycidyl polyethers of dihydric phenols, such as, for example, resinous polyols of the formula

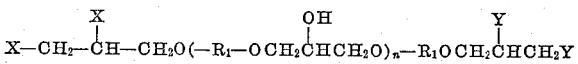

wherein one X and one Y are OH groups and the other X and Y are hydrogen, at least one $R_1$ is a cycloaliphatic radical and the other is a cycloaliphatic or aromatic radical and $n$ is an integer of at least 1 and preferably 1 to 50.

It has been found that the above-described new resinous polyols have surprising solubility characteristics, and despite their high molecular weight, have a high degree of solubility in solvents such as alcohol and ketone solvents. This not only permits reduction in cost of preparing of coating compositions but also permits use of the resinous polyols in the preparation of coatings, such as shellacs, where the prior known resinous polyols were unsuited. In addition, it has been found that coatings prepared from the new polyols or their derivatives have surprising resistance to discoloration and loss of gloss caused by exposure to outdoor conditions, and are far superior in this application to the coating compositions prepared from phenolic-type resinous polyols.

The polyepoxy polyethers of polyhydric phenols used in the preparation of the new resinous polyols of the invention are preferably the polyalkyl polyethers of polyhydric phenols such as obtained by reacting a polyhydric phenol with a slight excess of a halohydrin or dichlorohydrin in the presence of an alkaline material.

For clarity, many of the polyepoxyalkyl ethers of the polyhydric phenols will be described throughout the specification and claims in terms of an epoxy equivalency. The term "epoxy equivalency" as used herein refers to the average number of epoxy groups contained in the average molecule. This value is obtained by dividing the average molecular weight of the polyepoxyalkyl ether by the epoxide equivalent weight. The epoxide equivalent weight is determined by heating a one-gram sample of the polyepoxide with an excess of pyridinium chloride dissolved in pyridine. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

If the polyepoxyalkyl ethers consist of a single compound and all of the epoxy groups are intact, the epoxy equivalency will be integers, such as 2, 3, 4, and the like. However, in the case of polymeric-type polyether poly-epoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5, and the like.

Polyhydric phenols that may be used in the preparation of the above-described polyethers include, among others, resorcinol, 2,2-bis(4-hydroxyphenyl) propane, catechol, hydroquinone, methyl resorcinol, 2,2-bis(4-hydroxyphenyl) butane, 4,4'-dihydroxybenzophenone, bis(4-hydroxyphenyl) ethane and 1,4-dihydronaphthalene as well as more complex polyhydric phenols, such as pyrgallol, phoroglucinol and novolac resins from condensation of a phenol with an aldehyde in the presence of an acidic condensation catalyst. Preparation and description of some of such novolac resins may be found in "Phenoplasts" by T. S. Carswell, 1947, page 29, et sec. The epoxy-forming material, i. e., the halohydrins and dichlorohydrins, used in the preparation of the ethers may be exemplified by 3-chloro-1,2-epoxybutane, 3-bromo-1,3- epoxyhexane, 3-chloro-1,2-epoxyoctane, 1,3-dichloro-2-hydroxypropane, 2,4-dibromo-3-hydroxypentane, 2,3-dichloro-3-hydroxybutane, and the like. Epichlorohydrin comes under special consideration because of its low cost and because of the superior properties of the resinous polyols obtained from its resulting epoxy ethers.

The amount of the phenol and epoxy-forming material to be employed in this reaction will vary depending upon the type of product desired. If simple monomeric type products are desired, the phenol and epoxy-forming material are preferably reacted in chemically equivalent ratios varying from 1:4 to 1:8. If higher molecular weight hydroxy-containing products are desired, the epoxy-forming materials are used in smaller amounts and the phenol and epoxy-forming materials are reacted in chemical equivalent ratios varying from 2:1 to 1.8:1. As used herein, "chemical equivalent" amount refers to the amount needed to furnish one OH group for every epoxy group.

The desired alkalinity is obtained by adding basic substances, such as sodium or potassium hydroxide. The alkali is employed in at least chemical equivalent amounts, e. g., one mole of alkali for every epoxy group to be reacted, and is preferably utilized in excess of the epoxy-halo-substituted alkane.

The above reaction is preferably conducted by heating the mixture at temperatures ranging from about 50° C. to 150° C., and more preferably from about 80° C. to 125° C. Atmospheric, superatmospheric, or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene, and filtered to remove the salt. The product that remains may then be purified by any suitable method, such as distillation, extraction, and the like.

The preparation of some of the hydroxy-containing epoxyalkyl ethers of the polyhydric phenols will be illustrated below. Unless otherwise specified, parts indicated are parts by weight.

PREPARATION OF GLYCIDYL POLYETHER OF POLYHYDRIC PHENOLS

*Polyether A*

A solution consisting of 11.7 parts of water, 1.22 parts of sodium hydroxide, and 13.38 parts of bis-phenol-A was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' mercury method and a molecular weight of 483. The product had an epoxy value eq./100 g. of 0.40 so the epoxy equivalency was 1.9. The esterification value/100 g. was 0.915. For convenience, this product will be referred to as Polyether A.

*Polyether B*

About 228 parts of bis-phenol-A and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durrans' mercury method melting point of the resulting product is 52° C. and the molecular weight is about 710. The esterification value/100 g. was 0.961. The product has an epoxy value of 0.27 eq./100 g. so the epoxy equivalency is 1.9

*Polyether C*

By using a smaller ratio of epichlorohydrin to bis-phenol-A, a glycidyl polyether of higher melting point was obtained. Thus, Polyether C was obtained in the same manner as Polyether B except that for every mole of bis-phenol, there was used 1.57 moles of epichlorohydrin and 1.88 moles of sodium hydroxide. This provided a product having a melting point of about 70° C., a molecular weight of 900, and an epoxy value of 0.20 eq./100 g. The esterification value/100 g. was 0.747.

*Polyether D*

This glycidyl polyether of still higher melting point was prepared in like manner to that of Polyether A except that for each mole of bis-phenol-A there was employed 1.22 moles of epichlorohydrin and 1.37 moles of sodium hydroxide. The resulting product had a melting point of 98° C., a molecular weight of 1400 and an epoxide value of 0.103 eq./100 g. The esterification value/100 g. was 0.557.

*Polyether E*

Glycidyl polyethers of higher molecular weight and softening point are best prepared by reacting a lower polyether with less than an equimolecular amount of dihydric phenol. Thus, upon heating the above-noted product which has a softening point of 98° C. to a temperature of about 150° C. and then adding 5% by weight of bis-phenol-A after which the temperature is gradually increased to 190° C. in about 30 minutes followed by maintaining the temperature at this point for an additional 1½ hours, there is obtained a glycidyl polyether having a softening point of 131° C., and epoxy value of 0.05 eq./100 g. and a molecular weight of 2900. This will be referred to herein as Polyether E.

Preferred polyepoxyalkyl ethers are the glycidyl ethers of the general formula

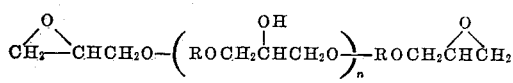

wherein R represents a divalent radical obtained by removing the hydrogen from two of the OH groups of a dihydric phenol and $n$ is an integer from 1 to 20.

Particularly preferred members of the above group comprise the glycidyl polyethers of dihydric phenols having a molecular weight above 400 and an epoxy equivalency between 1.0 and 2.5. Particularly preferred are those derived from bis-phenol-A(2,2-bis(4-hydroxyphenyl)-propane).

The glycidyl polyethers of polyhydric phenols are also referred to as "ethoxyline" resins. Chem. Week 69, 27 (1951).

Hydrolyzed derivatives of the polyepoxy compound described above may also be used. In that case, the products would possess

groups instead of

groups and would give hydrogenated products having more OH groups.

The hydrogenation of the polyepoxy ethers of the polyhydric phenols is accomplished by treating the ethers with hydrogen in the presence of a suitable catalyst. The hydrogenation is conducted so as to convert at least 60% of the aromatic structure to aliphatic structure, and more preferably to convert all of the aromatic rings to aliphatic rings.

The hydrogenation may be accomplished in the presence or absence of diluents or solvents, but for best results it is usually desirable to employ inert diluents, such as ethanol, isopropanol, ethylene glycol dimethyl ether, dioxane, and the like, and mixtures thereof.

Hydrogenation catalysts that may be used include nickel catalysts in various physical forms, its derivatives such as its oxides, and the metals of group VIII of the periodic table and particularly the metals of the platinum group, such as platinum, palladium, rhodium, ruthenium, osmium, and the like and their oxides and alloys. Metals of the platinum group are particularly preferred. These catalysts may be employed in a finely divided form and dispersed in and throughout the reaction mixtures, or they may be employed in a more massive state, either in essentially the pure state or supported upon or carried by an inert carrier material, such as pumice, kieselguhr, diatomaceous earth, clay, alumina, charcoal, carbon, or the like, and the reaction mixture contacted therewith as by flowing the mixture over or through a bed of the catalyst or according to other methods known in the art.

The amount of the catalyst employed may vary over a considerable range. In general, the amount of the catalyst (metal) will vary from .1% to 30% by weight of the reactants. Preferred amounts of catalyst range from 1% to 25% by weight. The above-described preferred catalysts (metal) are generally employed in amounts varying from 1% to 10% by weight.

Temperatures used during the hydrogenation will vary from about 30° C. to about 300° C. depending on the catalyst selected. With most active catalysts, such as rhodium, the hydrogenation may be accomplished at or near room temperature; with less active catalysts, preferred temperatures range from 100° C. to 250° C. Hydrogen pressure of about 50 pounds per square inch are effective, and higher pressures of the order of about 500 to 2000 p. s. i. can be used. Particularly preferred hydrogen pressures range from about 10 p. s. i. to 2000 p. s. i.

At the conclusion of the hydrogenation, the epoxy ethers may be recovered directly from the reaction mixture by any suitable manner. For example, the hydrogenation catalyst, if dispersed in the reaction mixture, may be removed by filtration or centrifugation and the solvent or diluent removed by distillation.

The products of the hydrogenation will have substantially the same structure as the starting epoxy ether with the exception that the epoxy groups will be converted to

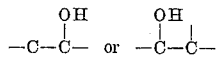

groups and a part or all of the aromatic rings will be converted to cycloaliphatic rings. Thus the preferred products obtained from the hydrogenation of the glycidyl ethers of the formula

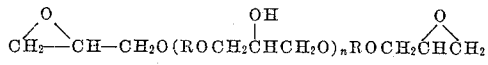

will have the structure

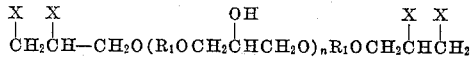

wherein one X and one Y are OH groups and the other X and Y are hydrogen, at least one $R_1$ is a cycloaliphatic radical and the others may be cycloaliphatic or aromatic and $n$ is an integer of 1 to 50.

The new resinous polyols of the present invention are low melting colorless to slight yellow solids. They have a high degree of functionality and preferably have from 3 to 10 free hydroxyl groups. They have unexpected solubility in solvents, such as ethanol, butanol and the like, as well as ketones, such as methyl ethyl ketone and isobutyl amyl ketone. They are also highly soluble in hydrocarbons and halogenated hydrocarbons and particularly aromatic compounds, such as benzene, toluene, tetrachlorobutane and the like, as well as mixtures of such solvents and the above-noted alcohols and ketones.

As polyols they are valuable as humectants, as softening agents for casein and other protein plastics, as textile lubricants, as lubricating oil additives and as blending agents for dyes, inks and paints. They are also useful as intermediates in the preparation of emulsifying agents, surface active agents, fungicides, herbicides, insecticides and tackifying and softening agents for natural and synthetic rubbers.

The polyols are especially valuable, however, in the preparation of coating compositions. In this application, they may be applied as a sealer composition or impregnating composition by the hot melt technique or in solution with solvents, such as ethanol, and the like. They are particularly valuable in ethanol solution as a shellac substitute.

They are particularly valuable in the preparation of insoluble infusible coating compositions where they are cross-linked by the addition of cross-linking agents, such as acidic materials, methylol-substituted compounds, such as methylol melamine, methylol phenols and ureas. They are particularly valuable in combination with these materials in the formation of clear or pigmented baked films.

The resinous polyols of the invention are also of considerable value in the preparation of modified alkyd resins. In this case, they are reacted with a suitable polycarboxylic acid or anhydride and the desired modifying agent. Preferred polycarboxylic acids to be used for this purpose include the unsubstituted dicarboxylic acids containing no more than 16 carbon atoms, such as, for example, the alkanedioic, cycloalkanedioic, aromatic hydrocarbon dicarboxylic acids and the alkyl-substituted aromatic hydrocarbon dicarboxylic acids such as, for example, phthalic acid, isophthalic acid, terephthalic acid, adipic acid, sebacic acid, cyclohexane-dicarboxylic acid, maleic acid, fumaric acid, itaconic acid, 1,8-naphthalenic acid, and mixtures thereof.

The modifying agents employed in producing the above-described alkyds comprising monohydric alcohols, as allyl alcohol, butyl alcohol, and octyl alcohol, monocarboxylic acids, such as, for example, butyric acid, capric acid, cyclohexanecarboxylic acid, chlorobutyric acid, benzoic acid, p-tert-butylbenzoic acid, 3,5-ditert-butylbenzoic acid, chlorobenzoic acid, fatty acids derived from natural oils, as drying oils, semi-drying oils and non-drying oils, such as linseed, soyabean, perilla, tung, walnut, pineseed, olive, oiticica, corn, cottonseed, coconut, hemp seed, herring, poppy seed, mustard, peanut, rapeseed, salmon, dehydrated castor oil, rubber seed, safflower, and the like, and mixtures thereof. Particular modifiers comprise the non-drying oil, semi-drying oil and drying oil fatty acids, and particularly those derived from dehydrated castor oil, soyabean oil, linsed oil, coconut oil, safflower oil and oiticica oil.

The alkyd resins are preferably prepared by heating the polyol with the polycarboxylic acid (or its anhydride) and the modifiers together, preferably in an inert atmosphere. Ordinarily, no catalyst need be employed to effect this reaction, but, if desired, substances as p-toluenesulfonic acid, zinc chloride, stannic chloride, calcium acetate, barium acetate, and the like, in amounts varying from about 0.1% to 5% by weight of reactants may be employed.

The proportions of reactants to be used in preparing the alkyds may vary depending upon the properties desired in the finished product. Ordinarily, the polycarboxylic acid or anhydride will be reacted with at least a chemical equivalent amount of the polyol and satisfactory results are obtained when up to 50% excess of the polyol is employed. A "chemical equivalent amount" as used herein in this regard refers to that amount of alcohol needed to furnish one OH group for every carboxyl group. In order to obtain superior alkyds, one preferably reacts the acid or anhydride with an excess up to 40% excess of the polyol.

The amount of the modifier to be combined with the polycarboxylic acid or anhydride and polyol will vary over a wide range depending on the type selected and the product desired. Generally, the amount of the modifier will vary from 20% to 80% by weight of the resinous product, with a preferred range of proportions varying from 30% to 70% by weight of the resin.

The temperature employed during the resin-forming reaction may vary over a considerable range depending upon the type of reactants, catalyst, etc. In most cases, the temperature will range between about 100° C. and 250° C., with a preferred range of between 200° C. to 230° C.

The alkyd formation may be accomplished in the presence or absence of diluents. If solvents and diluents are employed, it is desirable to utilize inert organic compounds, such as benzene, toluene, xylene, cyclohexane, and the like, and mixtures thereof.

It is preferred to accomplish the preparation of the alkyd resins under a blanket of an inert gas, at least during the initial stages of the reaction. By an inert gas is meant one substantially devoid of molecular oxygen, such as nitrogen, carbon dioxide, helium, methane, and the like.

When the reaction is substantially complete, the inert solvents or diluents, remaining water and uncombined reactants are preferably removed from the reaction mixture. Removal is conveniently accomplished by vacuum distillation, although fractional distillation, precipitation, may also be utilized.

The alkyds prepared from the new polyols are particularly valuable in the preparation of air-drying or baking coating compositions. For this application, they may be combined with various coating solvents or oils or may be added to compositions containing film-forming components such as vinyl polymers, aminoplast resins, cellulose ethers and esters and the like. The oil-modified alkyds are particularly useful in the preparation of baking lacquers and enamels. In this case they are preferably combined with urea-formaldehyde or melamine-formaldehyde resins and other desired components, such as pigments, plasticizers, stabilizers, and the like, and the mixture then diluted with solvents or diluents to provide a composition having the desired viscosity. This composition may then be applied to the desired surface and baked at temperatures generally varying from 100° C. to 175° C. The resulting baked films are very hard and have good flexibility.

The new polyols of the present invention may also be used to produce valuable monomeric esters and ethers. The esters of the polyols and monocarboxylic acids or acid esters of polycarboxylic acids are especially useful as plasticizers for vinyl polymers, and particularly the vinyl halide polymers, as they are compatible therewith and form very hard flexible films. The monocarboxylic acids used in producing such esters may be exemplified by butyric acid, hexanoic acid, caprylic acid, pelargonic acid, capric acid, lauric acid, palmitic acid, stearic acid, arachidic acid, sorbic acid, acrylic acid, methacrylic acid, crotonic acid, alphachloroacrylic acid, cyclohexanecarboxylic acid, toluic acid, methylbenzoic acid, nonylbenzoic acid, oleic acid, and the like and mixtures thereof. Mixed esters wherein one of the monocarboxylic acids is an aromatic acid and the other acid or acids is an aliphatic open-chain fatty acid are particularly good plasticizers for the vinyl halide polymers. The esters of the polyols and the unsaturated acids, such as acrylic acid and methacrylic acid, or the esters of the polyols and acid esters of polycarboxylic acids and unsaturated alcohols, such as allyl hydrogen maleate, are valuable as polymerizable plasticizers for the vinyl halide polymers as they may be mixed with vinyl halide polymers and a free radical yielding catalyst, such as a peroxide catalyst, and the combination then heated to effect polymerization. The products prepared in this monomer are very hard and tough but still highly flexible. The products plasticized in this monomer are useful in preparation of floor tile, seat covers, draperies and the like.

The new polyols may also be used to produce polyepoxy ethers which are valuable in the formation of pottings and castings. This may be accomplished by reacting the polyol with an epoxy-halo-substituted alkane or dihalohydroxy-substituted alkane to form a polyether halohydrogen and then treating that product with a dehydrohalogenating agent, such as sodium aluminate, to form the corresponding polyepoxy ether.

The new resinous polyols may also be further reacted with polyisocyanates to form valuable polyurethane polymeric products. Examples of such polyisocyanates include, among others the alkylene diisocyanates, such as trimethylene diisocyanate, tetramethylene diisocyanate, hexamethylene diisocyanate, heptamethylene diisocyanate, and the unsaturated polyisocyanates, such as 3-heptenediisocyanate-1,4,2,5-octadienediisocyanate-1,7 and the like, and aromatic polyisocyanates, such as 4,4'-diphenyl diisocyanate, m-phenylene diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, and the like and mixtures thereof. A detailed description of a method that may be used to prepare the polyurethane polymers from these isocyanates and the new polyols of the invention may be found in U. S. 2,381,063.

The new polyols may also be further reacted with alkylene oxides, such as propylene oxide, ethylene oxide, butadiene monooxide, and the like to form new hydroxy polyethers, such as those of the formula

wherein X is the residue of the resinous polyhydroxy-substituted polyethers of the present invention obtained by removing the desired number of OH groups, R is the residue of the alkylene oxide, $n$ is an integer such as 0, 1, 2, etc. up to as high as 50, and $y$ is 1, 2 or more depending on the number of OH groups on the resinous polyol.

The new resinous polyols may also be further reacted with alpha, beta-unsaturated nitriles, such as acrylonitrile, to form cyanoalkyl ether derivatives which may be reduced to form polyamines.

To illustrate the manner in which the invention may be carried out, the following examples are given. It is to be understood, however, that the examples are for the purpose of illustration and the invention is not to be regarded as limited to any of the specific conditions or reactants recited therein. Unless otherwise specified, parts described in the examples are parts by weight.

EXAMPLE I

This example illustrates the preparation of a resinous polyol by the hydrogenation of Polyether E and the use of that product in the preparation of improved coating compositions.

200 parts of Polyether E was dissolved in 700 parts of tetrahydrofuran and the mixture charged into a stainless steel hydrogenation vessel. 50 parts of catalyst (5% rhodium on $Al_2O_3$) was added and the vessel sealed. The air in the vessel was displaced by evacuating to 13 mm. and replacing with hydrogen. Hydrogen was introduced at a pressure of 250 p. s. i. The temperature of the vessel was raised to 50 to 70° C. and the vessel shaken. After 23 hours, hydrogen absorption stopped. At this point about 3.5 moles of hydrogen had been absorbed. Theoretical amount of hydrogen required for complete hydrogenation of the aromatic rings was about 3 moles. Ultraviolet analysis of the mixture confirmed there was substantially complete hydrogenation of the aromatic rings. The catalyst was then removed by filtration and the solvent removed by distillation. The resulting polyol was a light yellow clear solid having a hydroxyl value 0.363 eq./100 g. The solid was 90% soluble in ethanol and was completely soluble in mixtures of toluene and ethanol.

75 parts of the hydrogenated Polyether E produced above was combined with 25 parts of urea-formaldehyde resin (Beetle 227-8) and sufficient xylene to form a coating of the desired viscosity. This mixture was then sprayed on steel panels and the panels baked for 12 minutes at 165° C. The resulting films were very hard and flexible. Exposure of the films to outdoor conditions for 6 months showed no decomposition and no loss of gloss.

A white baking enamel was prepared by combining 100 parts of titanium dioxide, 75 parts of hydrogenated Polyether E produced above and 25 parts of a urea-formaldehyde resin (Beetle 227-8) and adding xylene to obtain the desired viscosity. This enamel was then sprayed on steel panels to form a film having a thickness of 1 to 1.5 mils. These panels were then baked for 30 minutes at 170° C. The resulting films were hard, tough and displayed excellent resistance to water and light and had excellent gloss. The baked films were exposed to outdoor conditions (45° south exposure) and to 700 cycles in the weatherometer. After 6 months of exposure and after the above-noted cycles in the weatherometer, there was no discoloration or loss of gloss of the films. Related films prepared from the unhydrogenated Polyether E, however, showed considerable discoloration and loss of gloss.

EXAMPLE II

This example illustrates the preparation of a resinous polyol by the hydrogenation of Polyether C and the use of that product in the preparation of improved coating compositions.

50 parts of Polyether C was dissolved in 100 parts of dioxane and the mixture placed in a glass reaction vessel. 15 parts of catalyst (5% rhodium on Al₂O₃) was placed in the bottle and the bottle placed in a Parr hydrogenation apparatus. Hydrogen was introduced at a pressure of 50 p. s. i. g. The temperature was maintained at 50° C. to 70° C. and the bottle shaken. After 24 hours, hydrogen absorption stopped. At this point the theoretical amount of hydrogen had been absorbed. Ultraviolet light analysis indicated that there had been substantially complete hydrogenation of the aromatic rings. The catalyst was then removed by filtration and the solvent removed by distillation. The resulting polyol was a light yellow clear solid having a hydroxy value of 0.341 eq./100 g. The solid was soluble in ethanol and mixtures of toluene and ethanol.

75 parts of the hydrogenated Polyether C was combined with 25 parts of urea-formaldehyde (Beetle 227-8) and sufficient xylene to form a coating of the desired viscosity. This mixture was then sprayed onto steel panels and the panels baked for 12 minutes at 165° C. The resulting films were very hard and flexible. Exposure of the films to outdoor conditions for 6 months showed no decomposition and no loss of gloss.

A white baking enamel was prepared by combining 100 parts of titanium dioxide, 75 parts of hydrogenated Polyether C produced above and 25 parts of urea-formaldehyde resin (Beetle 227-8) and adding xylene to obtain the desired viscosity. This enamel was then sprayed on steel panels to form a film having a thickness of 1 to 1.5 mils. These panels were then baked for 30 minutes at 170° C. The resulting films were hard, tough and displayed excellent resistance to water and light and had excellent gloss. The baked films were exposed to our outdoor conditions and to 700 cycles in the weatherometer. After 6 months outdoor and after 700 cycles in the weatherometer, there was no discoloration or loss of gloss of the films.

EXAMPLE III

This example illustrates the preparation of a resinous polyol by the hydrogenation of Polyether D and the use of that product in the preparation of improved coating compositions.

200 parts of Polyether D is dissolved in 700 parts of tetrahydrofuran and the mixture charged into a stainless steel hydrogenation vessel. 50 parts of catalyst (5% rhodium on Al₂O₃) was added and the vessel sealed. The air in the vessel is displaced by evacuating to 13 p. p. m. and replacing the air with hydrogen. Hydrogen was introduced at a pressure of 250 p. s. i. The temperature of the vessel was raised to 50–70° C. and the vessel shaken. After 24 hours, substantially all of the theoretical amount of hydrogen had been absorbed. The catalyst was removed by filtration and the solvent removed by distillation. The resulting polyol was a light yellow clear solid having at least 3 OH groups per molecule. The solid was substantially soluble in ethanol and in mixtures of toluene and ethanol.

A white baking enamel was prepared by combining 100 parts of titanium dioxide, 75 parts of hydrogenated Polyether D produced above and 25 parts of urea-formaldehyde resin (Beetle 227-8) and adding xylene to obtain the desired viscosity. This enamel was then sprayed on steel panels to form a film having a thickness of 1 to 1.5 mils. These panels were then baked for 30 minutes at 170° C. The resulting films were hard, tough and displayed excellent resistance to water and light and had excellent gloss. These properties were retained even after several months exposure to outdoor conditions.

Products having related properties are obtained by replacing Polyether D in the above process with equivalent amounts of each of the following: Polyether B, Polyether F, and Polyether A.

EXAMPLE IV

This example illustrates the preparation of a soyabean oil fatty acid ester of the hydrogenated Polyether E produced in Example I and its use in preparing coating compositions.

In a glass reaction vessel fitted with a phase separating condenser, stirrer and carbon dioxide bubbler, a mixture of 1200 parts of the hydrogenated Polyether E shown above and 2500 parts of soyabean oil fatty acid (95% of theory) was heated to 230° C. in 1 and ¾ hours and held at that temperature for an additional 6 hours. The mixture was then allowed to cool and reheated at a later time to 230° C. in 1 and ½ hour after addition thereto as azeotroping agent of a petroleum solvent having a boiling range of about 315° F. to 380° F. an API gravity of about 34.1 and containing about 65% aromatics. The heating was continued at 230° C. for 6 hours during which time the acid number was reduced to 17.9. The product was cooled, diluted to 50% solids with addition of the petroleum solvent and filtered to remove any insoluble material.

The above coating composition was applied to steel panels and air dried. The resulting films were very hard and tough and showed good resistance to water and had excellent gloss.

Related products are obtained by replacing the hydrogenated Polyether E in the above process with equal amounts of each of the following: hydrogenated Polyether D, hydrogenated Polyether C and hydrogenated Polyether F.

EXAMPLE V

This example illustrates the preparation of a modified alkyd resin from hydrogenated Polyether E and its use in the preparation of coating compositions.

51 parts of hexahydrophthalic acid, 300 parts of the hydrogenated Polyether E and 118 parts of dehydrated castor oil are placed in a reaction flask equipped with a stainless steel stirrer, nitrogen bubbler, thermometer and phase separating condenser. Xylene is used to remove the formed water azeotropically. The charge is brought to a cooking temperature of 230° C., and held at that temperature for several hours. The resulting product is a light brown resin having an acid number below 10.

A white baking enamel is prepared by combining 100 parts of titanium dioxide, 75 parts of the alkyd prepared above and 25 parts of a urea-formaldehyde resin (Beetle 227-8) and adding xylene to obtain the desired viscosity. This enamel is then sprayed on steel panels to form a film having thickness of 1 to 1.5 mils. These panels are then baked for 12 minutes at 165° C. The resulting films are very hard and tough and have excellent resistance to loss of gloss and to outdoor exposure.

Related products are obtained by replacing the hydrogenated Polyether E in the above process with equivalent amounts of each of the following: hydrogenated Polyether D and hydrogenated Polyether B.

EXAMPLE VI

This example illustrates the preparation of a polyglycidyl ether of hydrogenated Polyether E, and demonstrates some of the properties of the said polyglycidyl ether.

280 parts of hydrogenated Polyether E prepared as shown in Example I and 100 parts of epichlorohydrin were heated with stirring at 50° C. until the solution was homogeneous. The temperature was dropped to 35° C. and anhydrous stannic chloride was slowly dropped in over a period of 15 minutes. The reaction developed heat so cooling was necessary. When the reaction subsided, the temperature was raised to 90° C. and held there for 6 hours. The mixture was then diluted with 100 parts of toluene. The chlorohydrin ether of hydrogenated Polyether E formed by the above reaction was not isolated but dehydrochlorinated in the reaction mixture. This was accomplished by the slow addition of 35% NaOH (10% excess over theoretical amount to assure complete dehydrohalogenation) at a temperature of about 15° C. The aqueous phase was removed and the oil phase diluted with more toluene and washed with water. After removing the toluene under reduced pressure, a semi-solid product was obtained then analyzed .28 eq. epoxides/100 g. and a total chlorine content of 6%.

20 parts of the polyglycidyl ether of hydrogenated Polyether E produced above was dissolved in 15 parts of tetrahydrophthalic anhydride at 80° C. and then cooled to 50° C. .5 part of dimethylbenzylamine was then added and the mixture placed in a polyethene cup and cured at 80° C. for 3 hours. The product at that time was an almost water white polymer.

When 25 parts of the polyglycidyl ether of hydrogenated Polyether E produced above was mixed with 2 parts of diethylene triamine and the mixture heated at 100° C. for two hours, a hard yellow casting was obtained that had good resistance to boiling water.

A white enamel was prepared from the polyglycidyl ether of hydrogenated Polyether E by mixing 20 parts of the polyglycidyl ether with 7 parts of urea-formaldehyde resin (Beetle 227-8), 20 parts of titanium dioxide and 25 parts of a xylene-methyl ethyl ketone solvent mixture. This mixture was spread out on a tin panel and baked at 170° C. for 30 minutes. The resulting films were hard and flexible and displayed excellent resistance to discoloration and chalking after 8 months on outdoor exposure.

EXAMPLE VII

This example illustrates the preparation of a polyurethane from hydrogenated Polyether E.

400 parts of m-phenylene diisocyanate and 2925 parts of hydrogenated Polyether E were heated at 120° C. for a short period. The mass slowly hardened to form a tough solid polymer.

Related polymers are obtained by replacing the m-phenylene diisocyanate with equal amounts of each of the following: 4,4'-diphenyl diisocyanate, 4,4'-diphenylene methane diisocyanate and 1,5-naphthalene diisocyanate.

I claim as my invention:

1. A resinous product of the group consisting of hydrogenated poly(epoxyalkyl) polyethers of polyhydric phenols which polyepoxy polyethers have an epoxy equivalency greater than 1.0, and their ethers, esters and urethanes.

2. An insoluble infusible product obtained by reacting the resinous product of claim 1 with a cross-linking agent of the group consisting of acidic compounds, methylol-substituted compounds and urea-formaldehyde resins.

3. A resinous product comprising at least a 50% hydrogenated glycidyl polyether of a polyhydric phenol which glycidyl polyether has an epoxy equivalency greater than 1.0.

4. An insoluble infusible product obtained by reacting a resinous product as in claim 3 with a methylol-substituted compound.

5. A resinous product having the general formula

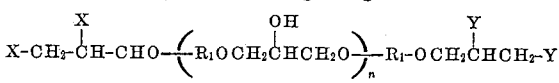

wherein one X and one Y are OH groups and the other X and Y are hydrogen, at least one $R_1$ is a cycloaliphatic radical and the other is a member of the group consisting of cycloaliphatic and aromatic radicals, and $n$ is an integer of 1 to 50.

6. A resinous product comprising a substantially completely hydrogenated glycidyl polyether of a dihydric phenol which glycidyl polyether has a molecular weight between 400 and 3000 and an epoxy equivalency between 1.0 and 3.0.

7. A product as in claim 6 wherein the dihydric phenol is 2,2-bis(4-hydroxyphenyl) propane.

8. A product as in claim 6 wherein the dihydric phenol is resorcinol.

9. An insoluble infusible product obtained by reacting a resinous product as defined in claim 8 with a urea-formaldehyde resin.

10. A product comprising a substantially completely hydrogenated glycidyl polyether of a novolac resin which glycidyl polyether has a molecular weight above 400 and an epoxy equivalency greater than 1.0.

11. A resinous product comprising a substantially completely hydrogenated glycidyl polyether of 2,2-bis(4-hydroxyphenyl) propane which glycidyl polyether has a melting point above 27° C., a molecular weight between 4000 and 3000 and an epoxy equivalency greater than 1.0.

12. An ester of (1) a resinous product comprising at least a 50% hydrogenated glycidyl polyether of a polyether of a polyhydric phenol which glycidyl polyether has an epoxy equivalency greater than 1.0, and (2) an unsaturated fatty acid.

13. An ester as in claim 12 wherein the unsaturated fatty acid is soyabean oil fatty acid.

14. A modified alkyl resin comprising the reaction product of (1) a resinous product comprising at least a 50% hydrogenated glycidyl polyether of a polyhydric phenol which glycidyl polyether has an epoxy equivalency greater than 1.0, and (2) a dicarboxylic acid anhydride, and (3) a monocarboxylic acid modifying agent.

15. A modified alkyd as in claim 14 wherein the dicarboxylic acid anhydride is phthalic anhydride and the monocarboxylic acid modifying agent is an unsaturated fatty acid.

16. A glycidyl ether of a resinous product comprising at least a 50% hydrogenated glycidyl polyether of a polyhydric phenol which glycidyl polyether has an epoxy equivalency greater than 1.0.

17. A process for preparing resinous products which comprises exposing a poly(epoxyalkyl) polyether of a polyhydric phenol which has an epoxy equivalency greater than 1.0 to hydrogen in the presence of a catalyst of the group consisting of nickel catalysts and metals of the platinum group.

No references cited.